Inventors
Melvin K. Allen
Ole Gunst
Arthur H. Lambert
By their Attorney
Richard A. Wise Dec. 29, 1970 M. K. ALLEN ET AL 3,550,238

MULTI-LEAD COMPONENT INSERTER

Filed March 28, 1968 12 Sheets-Sheet 10

United States Patent Office 3,550,238

Patented Dec. 29, 1970

3,550,238

MULTI-LEAD COMPONENT INSERTER

Melvin K. Allen, Los Angeles, Ole Gunst, Topanga, and Arthur H. Lambert, Los Angeles, Calif., assignors to USM Corporation, Boston, Mass., a corporation of New Jersey Filed Mar. 28, 1968, Ser. No. 716,727
Int. Cl. H05k *13/04, 13/00*
U.S. Cl. 29—203 8 Claims

ABSTRACT OF THE DISCLOSURE

A machine for precision mounting of components having a plurality of leads. The machine includes a means to transfer the components, one at a time, from a commercially available package of these components through a plurality of zones where the leads will be oriented with respect to their component bodies for subsequent insertion. The machine is then able to accurately and precisely insert the leads of each group simultaneously into preformed holes in a receiving means such as a printed circuit board. The machine automatically feeds the components one at a time, properly orients and positions each of the leads, inserts the leads into their respective receiving holes and then secures the component in its proper position, clinching the leads to effect proper electrical connection on the underside of the receiving circuit board.

BACKGROUND OF THE INVENTION

With the increased sophistication of electrical accessories, electrical manufacturers have been faced with the problem of simultaneously reducing the size of a complete electrical apparatus while retaining quality of performance. The industry has partially solved the problem of using smaller components such as transistors and more recently has developed an integrated package-type component containing several functionally discrete circuit elements molded into a single substantially uniform body unit and having a plurality of leads extending therefrom, generally in dual rows on opposite sides of the body.

In order to achieve reliably high quality as well as to keep the final cost of the manufactured apparatus to a minimum, it has been found most desirable to use printed circuit boards and to automatically insert as many of the required components therein as possible. The use of automatic inserting machines such as is disclosed in U.S. Pat. No. 2,896,213 granted to Alderman et al. enables an assembler to place successive two-lead components rapidly into prebored holes within the circuit board. The inserting head of the machine cyclically receives the components from a supply, bends the leads into parallelism, the leads lying in approximately the same plane and spaced apart a distance equal to the spacing of the receiving holes, and then thrusts the leads endwise into the holes in the board. Because of the placement of the component bodies, it has been necessary when using presently available component inserting equipment to provide a separate pair of receiving holes for each component. These pairs have necessarily been distally spaced from each other to prevent the mechanism inserting one component from dislodging or impairing an adjacent previously inserted component. To minimize the total area of a circuit board, and for other reasons, the package or integrated multi-lead component was developed.

While the packaged component concept allows reduction in the size of the circuit board, it has had one main drawback. Until the present time there has been no equipment which could automatically, reliably, and continuously insert the components of the multi-lead type. If a manufacturer desired to use the package-type component above described, it was necessary to have an operator manually with great care mount the package component, making sure that each of the leads was received in its proper receiving hole and then clinched beneath the board to secure the component in place in its circuit.

Although, as mentioned above, the automatic insertion and securement of axial lead components has been known in the art, the automation of the insertion of the package-type component presented new and complex problems. In the first place, the axial lead component was generally cylindrical in shape with the leads extending generally along the axis of the cylinder. With a component of this shape, it was not necessary to determine which side was up or down or to differentiate between ends.

Integrated or package-type components are generally of a solid rectangular shape and the slender pliant leads extend outwardly and downwardly from opposite portions of the main body of the component in much the same fashion as the legs of an insect. In order properly to orient the leads of this multiple-lead component for rapid and accurate insertion, the individual leads must be accurately positioned, deflected if necessary, in more than one direction. Firstly, considered transversely of the component body, ends of the leads must be spaced a predetermined distance apart so that they can be freely inserted into the prebored holes which are at a corresponding distance apart. Secondly, the leads in a row along a given side of the component must be properly spaced from each other so that no more than one lead will go into its intended hole, and further so that no lead will be jammed against a surface of the circuit board resulting in a defective board and perhaps a jammed machine.

It is the main object of the present invention to provide a machine which will reliably handle multiple lead package-type components as they are shipped from the manufacturer, properly orient the several leads of the components with respect to their bodies and relatively to each other, and insert all the leads of each component simultaneously into prebored holes in a circuit board.

As a feature of the present invention there is provided a machine which will receive package-type components and, by successively feeding them through two unique lead positioning zones, accurately locate each of the components and its preconditioned leads to enable a rapid and consistent insertion of the leads into preformed receiving holes.

It is yet another object of the present invention to not only provide a machine for rapidly and accurately inserting multi-lead components without close operator attention, but further to provide a machine which will automatically stop operation in the event of a misinsertion, a shortage of components ready for insertion, or any one of many other commonly occurring errors. The machine will either remedy these malfunctions itself or completely shut down awaiting operator attention.

To this end and, as a feature of this invention, there is provided a series of sensing devices which automatically determine whether or not the machine is operating properly and either recycle the machine to correct the error or prevent further opeation of the machine which could well demage the cicuit board, components or the machine itself.

It is a further feature of this invention that presequence multi-lead components may be fed in the machine which will retain the components in their prearranged order throughout the lead positioning and insertion steps, thus assuring that the component will be inserted into the circuit board with every lead electrically connected in precisely the manner intended.

The above and other features of the invention including various novel details of construction and combinations of parts will now be more particularly described with reference to the accompanying drawings and pointed out in the claims.

DESCRIPTION OF THE PREFERRED EMBODIMENTS

Figure 1:
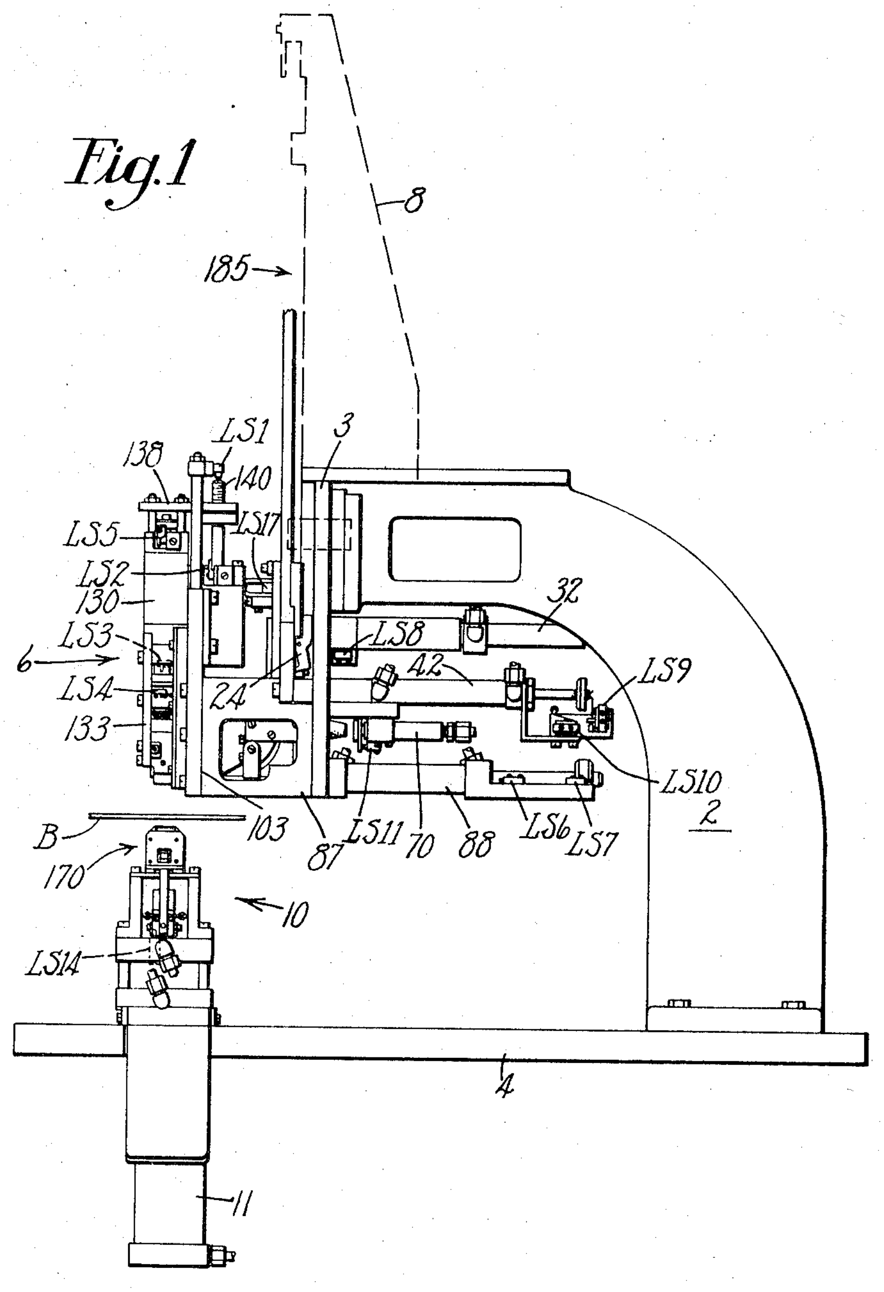
FIG. 1 is a side view of an illustrative machine embodying the invention.

As shown in FIG. 1, the illustrative inserting machine generally comprises an upstanding hooked frame member 2 which is rigidly mounted upon a base 4. Mounted upon the front end of the frame member 2 is an upright 3 (FIGS. 1, 3, 4) for supporting, inserting and lead positioning means generally designated 6, above which is secured a component feeding mechanism 8. Directly below the inserting mechanism 6 is a clinching mechanism generally designated 10 elevated to operating position at appropriate times by a piston actuating cylinder 11.

Figure 2:
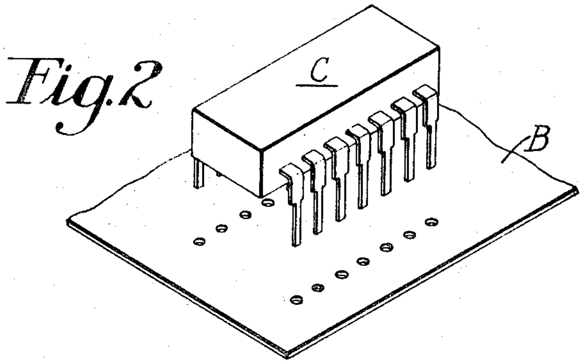
FIG. 2 is a perspective view of one form of integrated component as prepared by this machine and ready for mounting on a circuit board.

The component C as seen in FIG. 2 is an idealized representation showing the component with the leads as they would be held in position by lead positioning mechanism later described. Note that the leads along opposite sides of the component are equally spaced apart and lie in a plane which is generally perpendicular to a receiving circuit board B (FIGS. 1–3, 14, 15) and passes through its lead receiving holes. The leads of the component are arranged similar to the legs of an insect and have shoulders which are so spaced heighwise that when engaging the board B, the body of the component will be spaced from the board.

Figure 3:
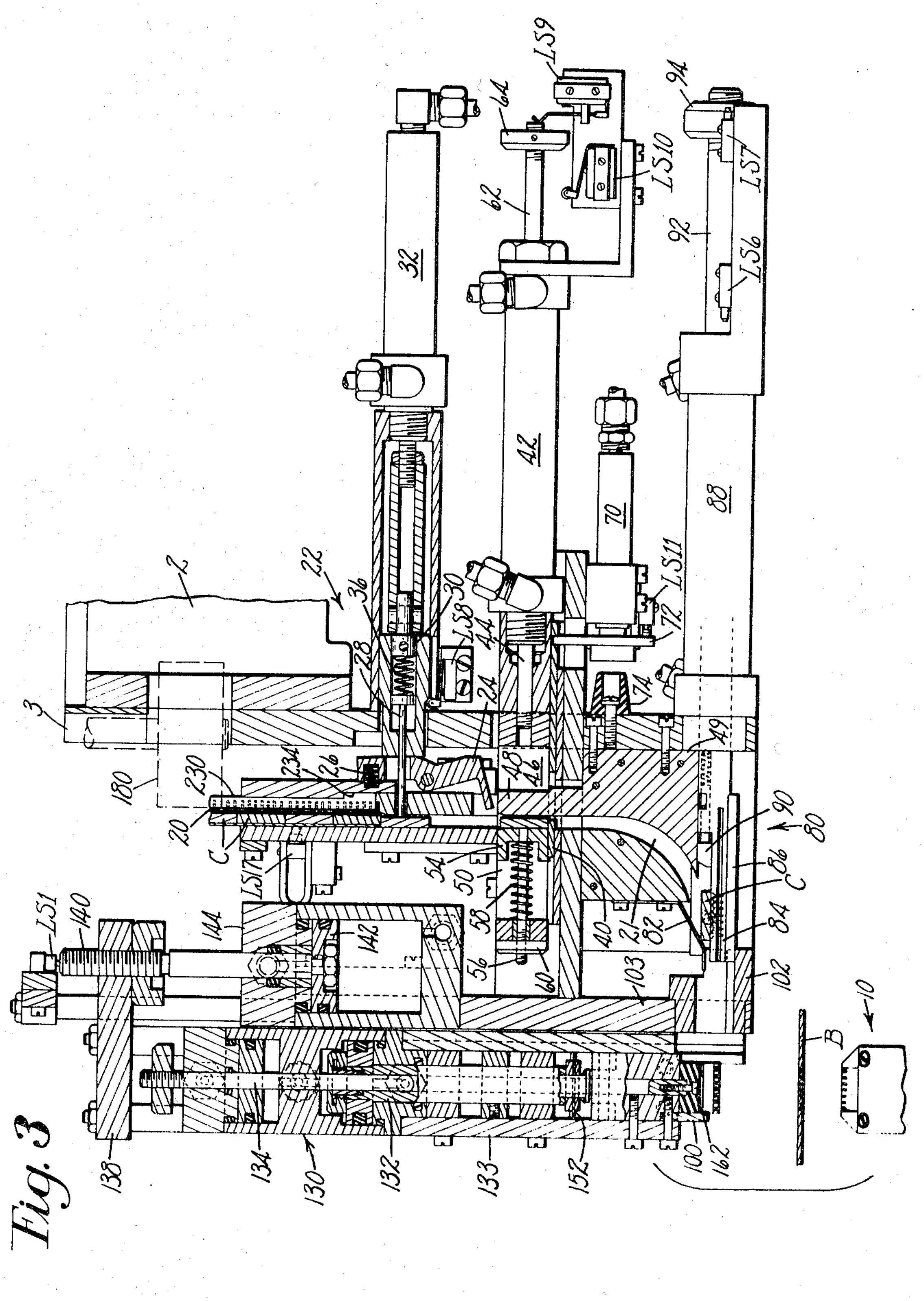
FIG. 3 is a vertical section through the main working mechanism of the illustrative embodiment.

Referring now to FIG. 3 which is a cross sectional view of the lead positioning and component inserting mechanism 6, a series of vertically disposed components C having a plurality of leads, respectively is gravity-fed by the mechanism 8 down a chute 20 until stopped by escapement designated generally 22 next to be explained. It is by means of this mechanism 22 that it is assured that only one component will be processed at successive operating stations to be described at any given time.

The escapement 22 comprises two separate hold-in means of a device for restraining the travel of each component C down the chute 20. The device is designed so that a generally L-shaped member 24, which is pivoted about the upright 3 at a point midway up the longer of its two legs and is string-biased by a spring 26, will have a shorter leg projectable into the chute 20 to stop successive components C from proceeding down the chute. Horizontally extending through a hole in the longer of the two legs of the member 24 is a rod 28 which is telescopically related to the tubular head of a rod 30 of larger diameter. This rod 30 is in turn adjustably connected by a rigid shaft to a piston rod of a double acting air cylinder 32 and slidably extends through the upright 3. The generally L-shaped member 24 and the rod mechanism 28, 30 are so designed that when the rod 28 is in its extended or component engaging position, i.e., in the chute 20, the larger rod member 30 will abut the rearward portion of the long leg of the L-shaped member 24 and pivot it counter clockwise so that the foot or shorter leg of the member 24 will be removed from its obstructing position within the chute 20 to permit passage of one preceding component.

When the cylinder 32 is reversely actuated, the rod 30 will be retracted, will close a switch LS8 (FIGS. 3, 18) and will reduce the pressure on the spring 36 thereby allowing the lower foot of element 24 to return to its position blocking the chute 20. A compression spring 36 nested in the rod 30 to act on the rod 28 is provided to assure that rod 28 holds the next component C until the member 24 again obstructs passage 20. As the rod 28 retracts and the foot of the element 24 proceeds into the chute 20, the stack of components C will shift downwardly until they abut the foot of the element 24. When the air motor 32 is signaled, by a control system later described, that the first forming station described below is ready for another component, the rod 28 extends forwardly again, abutting the next upper component to hold it in place. Thereupon, the larger circumference rod 30 abuts the rear portion of L-shaped member 24, causing the foot to retract and a single component i.e., that resting upon the foot and previously escaping the rod 28, will proceed to the next operative station.

Figure 8:
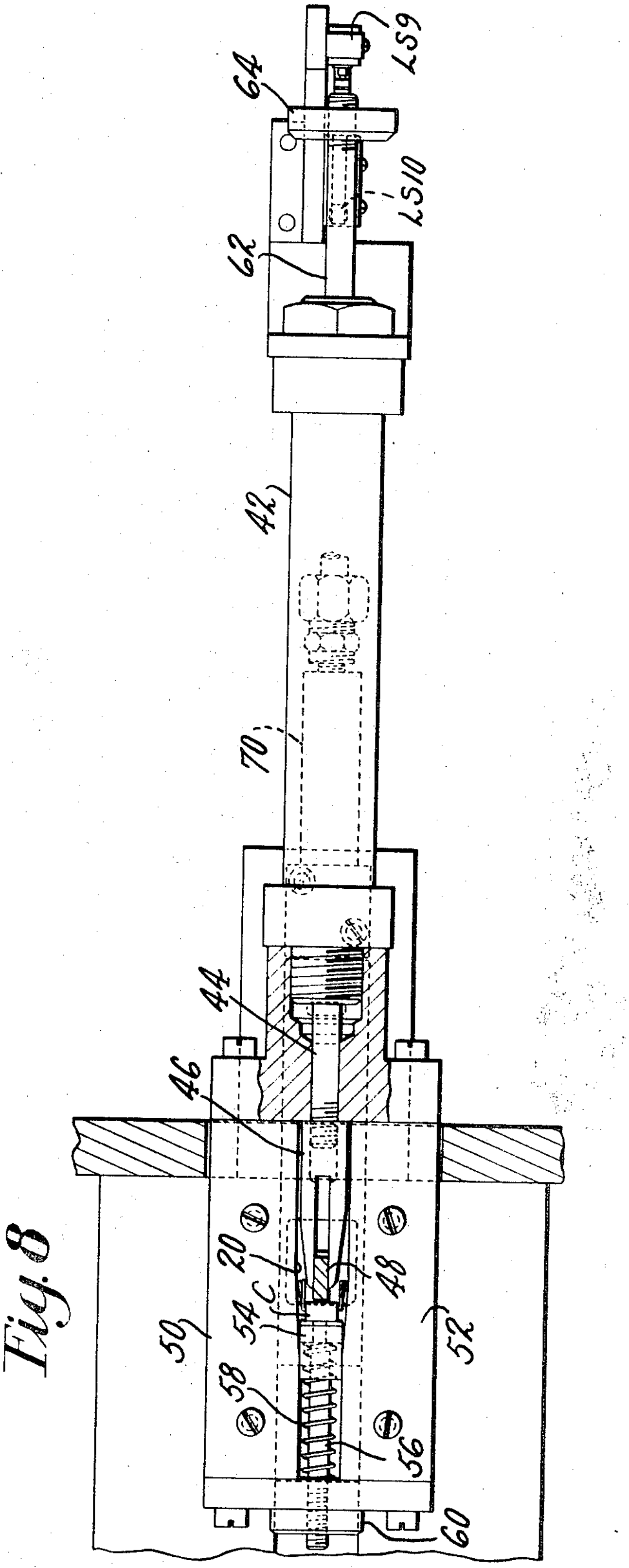
FIG. 8 is a plan view of mechanism shown in FIG. 3 which performs a first lead orienting operation.

As a released component travels downwardly in the chute 20, the next operating station (FIGS. 3, 8, 9) is the first of two lead positioning or conditioning stations. The component falls freely endwise in the chute 20 until it abuts a horizontally reciprocable gate 40 (FIG. 3) which has closed off the chute and is operable as later explained. With the component arrested in this position, a cylinder 42 is pressurized, moving its piston rod 44 and its threadedly attached bifurcated conforming member 46 to the left toward the component. As shown in FIG. 8, the bifurcated member 46 straddles a post 48, constituting a part 49 of the chute 20. The part 49 is secured to the upright 3. Directly to the left of the component C and yieldably transversely of the chute 20 is an abutting plate 54 which is fastened to one end of a rod 56. The latter is surrounded by a compression spring 58 urging the rod rearward. The rod is slidable in a bore of a block 51 and carries at its front end a positioning nut 60. On opposite sides of the lead conforming member 46 and the yieldable abutting plate 54, there is a pair of stationary outside formers, 50 and 52. It is to be noted that these formers have their confronting walls spaced so that the abutting plate 54 may freely slide between the two outside formers, and their lead engaging surfaces diverge rearwardly forming a funnel-shaped opening which faces the cooperative lead spreading or conforming member 46.

Figure 9:
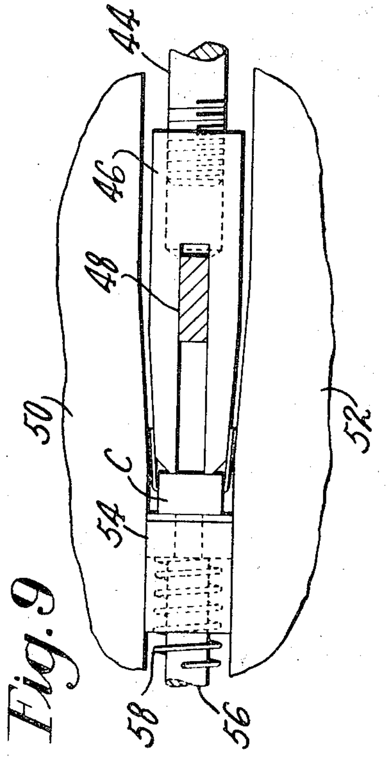
FIG. 9 is an enlarged detail view of the lead conforming or straightening means or FIG. 8.

In FIG. 8 the air cylinder 42 has its rod 44 in retracted position and the bifurcated member 46 is in its rearwardmost position, allowing a component C (even though its leads be non-uniformly spaced) to easily slide down the chute 20 and come to rest upon the gate 40. In FIG. 9 the bifurcated member 46 is shown in its forwardmost or extended position, the piston of the air cylinder 42 having been moved to its forward position by means later explained. It is to be noted that the post 48 is now further received within the bifurcated member but not abutting the rearwardmost portion of the bifurcation, so that in the event of a component not being in position, further movement of the member 46 is possible. The spring 58 is compressed by force directed through the component body by the member 46 and the abutting plate 54 is yieldingly moved frontward between the two outside formers, 50, 52. Component C may thus be forced into the flanged funnel portion of the outside formers 50, 52, and the plurality of oppositely extending leads is thus deflected by the member 46, if necessary, to an outwardly expanded, predetermined position. There preferably is a small clearance between the bifurcated member 46 and the inner surfaces of the outside formers, 50, 52, to assure that, with the leads deflected, there is no jamming of the bifurcated member 46 within the opening formed by the outside formers 50, 52. It is not critical at this stage that the leads of the component C be precisely positioned, but it is necessary that any leads which may have been unduly bent inwardly be deflected to a uniform outward position, but not beyond a maximum spread allowed by the formers, so that they may be properly oriented at a later lead positioning station. For control purposes to be described, a rod 62 (FIGS. 3, 8) extends from the rear of the piston in the cylinder 42. Adjustably mounted upon this rod is a knob 64 arranged to contact and actuate a switch LS10. The rearmost end of rod 62 is designed to actuate a switch LS9.

If a component C is present on the gate 40, the cylinder 42 will automaticaly be pressurized to move rods 44 and 62 to the left in FIG. 3 closing the switch LS9 but not the switch LS10, the movement of the rods being stopped by the resistance of the spring 58. In the event that no component C is present in the lead forming zone, the piston of the cylinder 42 will not encounter sufficient resistance from the spring 58 as applied via the member 46 until after the knob 64 has contacted and closed the switch LS10. The closure of the switch LS10 allows the piston of the cylinder 42 to be reversed by air pressure and opens the escapement 22 by actuating its piston-cylinder allowing another component to slide down the chute 20 to the foot of the member 24. It is to be understood that when the machine includes an automatic feed of the alternate type described below that the closure of the switch 66 would also activate this alternate automatic feed, placing another cartridge of components in position to slide down the chute 20, but that if the chute is hand supplied with groups of components successively, a warning light might consequently be flashed and the machine stopped until more components are made available in the chute.

Upon release of pressure on the component C by the bifurcated element 46 following the spreading of opposed leads, the spring 58 will expand and urge the component C transversely back to its position in alignment with the passageway of the chute 20 and supported by the gate 40.

Referring again to FIG. 3, the gate 40 is moved between its pass and its halt positions by the piston rod (not shown) of an air cylinder 70 fixedly secured to the machine. For this purpose the piston rod is rigidly connected to the gate 40 by means of a joining element 72. The latter contacts a limit switch LS11 at the full open position of the gate 40. Mounted upon the rearward portion of the frame member 49 is a resilient stop 74 providing a non-jarring positioning abutment for the gate 40 at the halt position.

Figure 10:
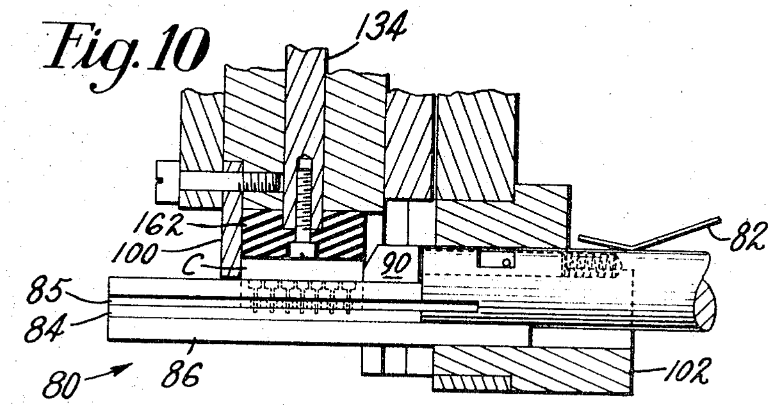
FIG. 10 is a vertical section showing on a larger scale mechanism seen in FIG. 3 for transferring a partially prepared component from the bottom of the chute to the inserting mechanism of FIG. 4.

Upon release from the gate 40, the component C which now has its opposed pairs of leads in an outwardly, uniformly spread position, proceeds down the chute 20 through a curved delivery end portion 21, which changes the orientation of the component from vertical (leads horizontal) to a horizontal, leads-down, fore-aft disposition. As the component C leaves the curved portion 21 of the chute 20, its leads straddle a horizontal bar portion of a transfer mechanism generally designated 80 (FIGS. 3, 10). A downwardly biased leaf spring 82 mounted upon the frame prevents the component C from moving forward under its own inertia beyond the end of the transfer mechanism 80 and initially allows a relative advance of the bar portion laterally.

Figure 4:
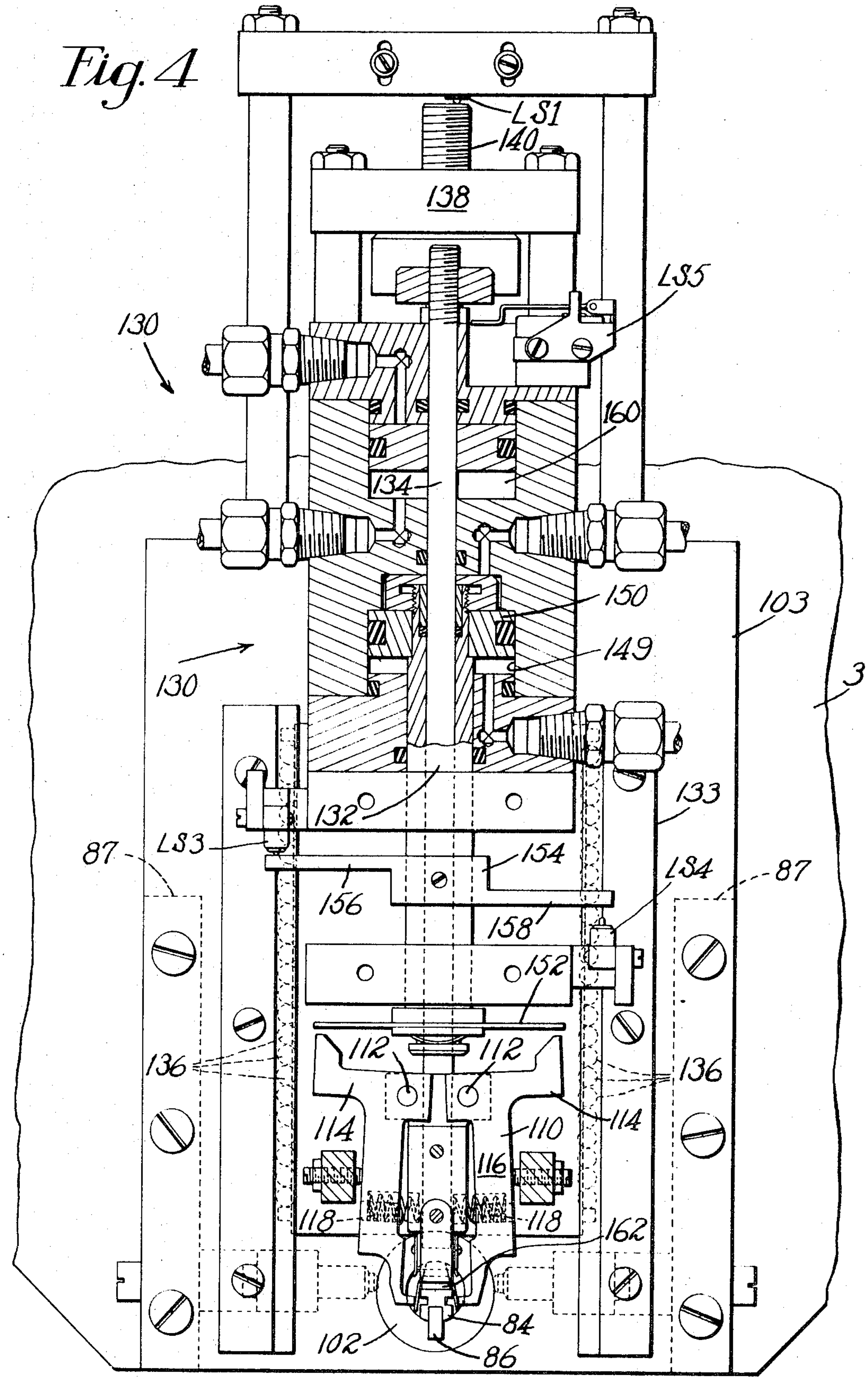
FIG. 4 is an enlarged front view partially in section of an inserting mechanism of the illustrative machine and also shown in FIG. 3.

The transfer mechanism 80 comprises a component carrying bar 84 (FIGS. 3, 4, 10–12) having a flat horizontal upper surface upon which the component body rests, and a pair of horizontal channels 85 respectively extending along opposite sides of the bar. The bar is mounted upon a slidable key 86 held against rotation within the bore of a bushing 102 supported by a later mentioned vertical bracket 103 (FIGS. 1, 3, 4) that is secured parallel to the upright 3 by means of a pair of spacer blocks 87 (FIGS. 1, 4). This allows horizontal reciprocation of the bar 84 which moves the component C resting thereupon forwardly from its position at the end of the chute 20 to a position immediately below the inserting mechanism 6. To this end the carrying bar 84 is directly connected to the double acting piston rods of an air motor 88, which cyclically reciprocates the transfer mechanism causing successive components to be carried to a position for effecting lead insertion and then retreating to allow insertion. Mounted upon the upper surface of the transfer bar 84 is a spring biased pusher bar 90 which, during transfer of the component from its position beneath the chute 20 to a position beneath the insertion mechanism 6, predeterminedly positions the component body endwise on the bar 84 by cooperating with the spring 82. When the transfer mechanism reaches its forwardly extended position (see FIG. 10) the bar 90 causes the component C yieldingly to abut a downwardly extending front stop 100 secured to the mechanism 6.

As shown in FIG. 3, the transfer mechanism 80 has a rod 92 extending to the right and connected to the piston rod of the air motor 88. Threaded to the rear end of the rod 92 is a knob 94 arranged to activate two switches LS6, LS7 (FIGS. 18, 19*a*) bracketed to the fixed cylinder 88. When the transfer bar 84 moves to its position beneath the inserting head, described below, the switch LS6 is closed by the knob 94 to signal commencement of the inserting operation, as will be explained. When the transfer bar 84 returns, the switch LS7 is closed by the knob 94 and the gate 40 is thereby signaled to release another component, the next to be transferred for insertion.

Figures 11, 12, 13:
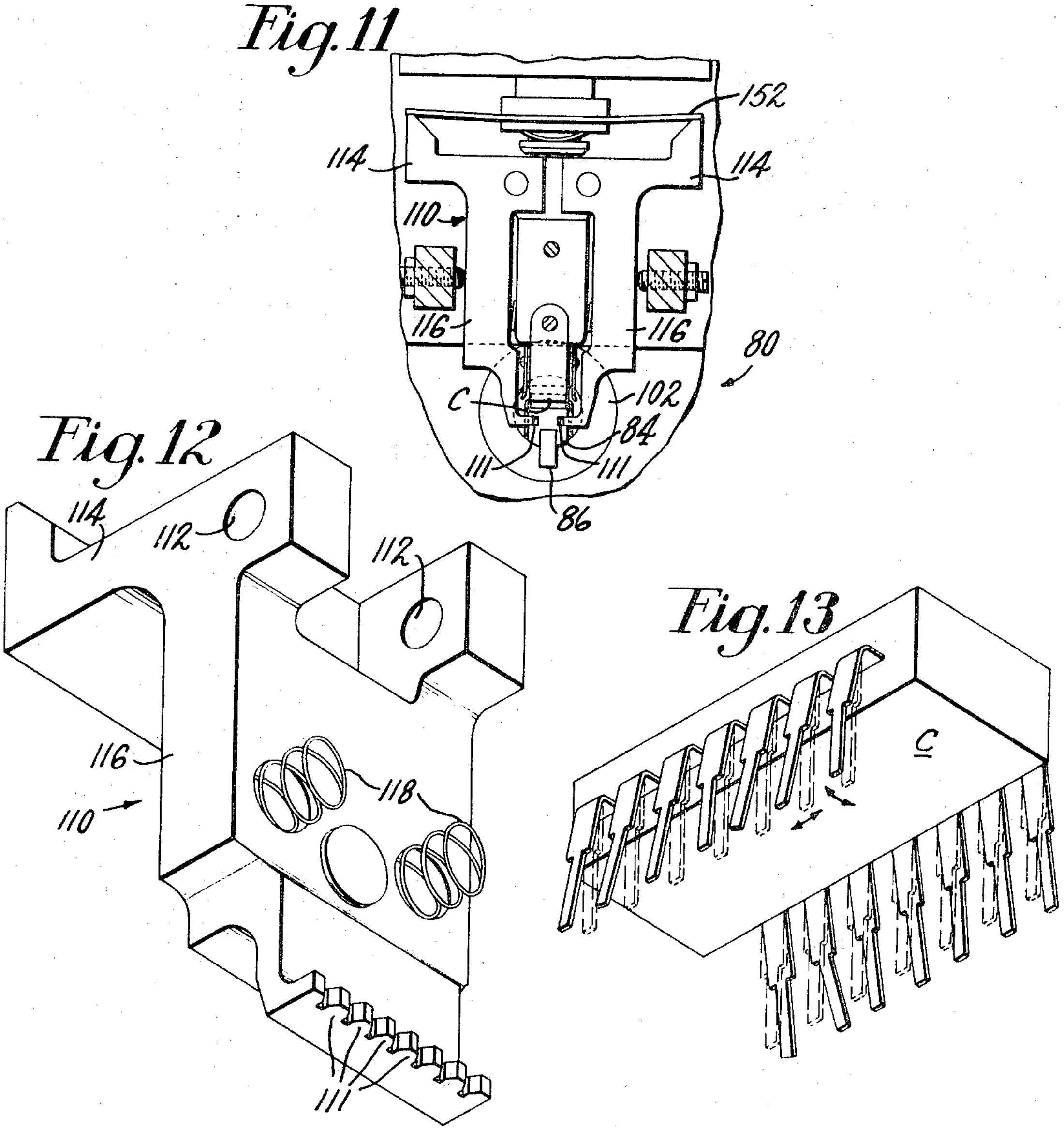
FIG. 11 is a front view of a second means for orienting the leads of the component and maintaining them in the proper position for insertion, the parts being shown in closed operating positions as distinguished from FIG. 4 where they are open.
FIG. 12 is an enlarged perspective of one of the finger members or guide combs shown in the mechanism of FIG. 11.
FIG. 13 is a perspective view of a typical component inserted by the illustrative machine, the leads in phantom positions indicating deflections required from their initial full line condition.

The transferred component C is now in proper position for the final lead positioning operation, a prerequisite to insure the insertion of all its leads simultaneously. As best seen in FIGS. 4 and 11, the component C about to be mounted rests upon the transfer bar 84 with the leads extending downwardly along opposite vertical sides of the transfer bar 84 and overlying its opposite grooved portion 85. When the component is abutting the stop plate 100, i.e., in position for insertion, a pair of pivotal lead guiding members, 110, 110 (FIGS. 4, 11, 12) is in the open position shown in FIG. 4, i.e., whereat they do not interfere with reception of the component C.

During the relative lead positioning next to be described and the subsequent component insertion operation, the members 110 are pivoted to urge their inwardly directed series of equi-spaced fingers 111, 111, respectively, between the leads in the adjacent rows and preferably in the vicinity of their lower ends, as shown in FIG. 11. The tapered fingers 111 positively control the position of the component leads by both deflecting the leads inwardly to the predetermined extent necessary and separating them a predetermined distance apart lengthwise of the component body.

As shown in FIG. 12, each of the lead guiding members 110 is in the form of a bell crank which has its pivot point at 112, has a force receiving arm 114, and a depending leg 116 which is biased outwardly by compression springs 118 and terminates at its lower end in the plurality of fingers 111. These fingers are arranged to fit within the opposite grooves 85 in the transfer bar 84 and of proper separation, according to the spacing of the lead receiving board holes, to accommodate the leads. The lead guide members 110 are cooperatively movable so that the fingers 111 interdigitally fit between the leads of the respective rows of the component C and thus hold the lower ends of the leads registered in the precise required position for insertion. It is to be remembered that the first lead positioning station in the chute 20 merely assured that the leads were in a sufficiently outwardly directed position. The second lead positioning station now being explained controls and directs positioning of the leads individually inwardly of the component body against their natural resilience to the proper position for insertion, and, if necessary, relatively displaces the leads along each side of the component to a position lengthwise of the body whereat they are correctly spaced from each other to assure proper endwise insertion in the receiving holes.

The insertion process will be described after a brief summary of the preparatory steps described thus far. The illustrative component C is placed in the chute 20 which guides it through the early stages of lead formation. The first operative step is to spread opposite pairs of the leads to an outwardly flanged and roughly uniform position. The component then proceeds downwardly and out of the chute to a horizontal position whereat it rests on the transfer bar 84. The transfer bar presents and temporarily supports the component body in a predetermined position for two-way lead-adjustment prior to insertion. The fingers 111 then accomplish this adjustment by being moved inwardly beneath the component body fixedly to support it and relatively positioning the leads as necessary for their insertion, the transfer bar 84 thereupon being retracted to enable the component to be inserted.

THE INSERTING MECHANISM

Referring now mainly to FIGS. 3 and 4, the inserting mechanism 6 comprises a main head generally designated 130 mounted for vertical reciprocation and including therein a hollow rod 132 relatively movable heightwise for pivotally actuating the members 110 and a relatively movable rod 134 telescoped in the rod 132 for doing the actual insertion.

The entire head 130 is mounted for cyclical reciprocation heightwise between rows of ball bearings 136 (FIG. 4) disposed in vertical races provided by a bearing bracket 133 secured via the bracket 103 and the upright 3 to the main frame 2. The upper portion of the head 130 is rigidly fastened to a cross bar 138 (FIGS. 3, 4) which extends rearwardly and is in turn rigidly connected to a vertical piston rod 140 operatively connected to a reciprocable piston 142 of an air motor 144 fast on the bracket 103. The air motor 144 accordingly controls heightwise operation of the head 130 cyclically in response to air pressure admitted to one or the other side of the piston 142 by operation of the later described pneumatic control system.

Referring again to FIG. 4, the reciprocable hollow rod 132 is movable heightwise relative to the head portion 130. For this purpose the main head portion 130 has machined therein a cylinder wall 149 which houses a piston 150 secured on the rod 132, and has appropriate ports so that the piston 150 is double acting. The lowermost portion of the rod 132 is connected to a flexible diaphragm 152 for actuating the fingers 111 widthwise of the component. In FIG. 3 the diaphragm and the cylinder 150 are shown in their uppermost position. The reader is referred to FIG. 11 wherein the diaphragm is shown in its lowermost or operating position with its outer margin pressing downwardly against the shorter legs 114 of the members 110. Under this yieldable force the actual working portions 111 act upon and position the individual leads of the component C as previously indicated.

Rigidly mounted to the exterior of the hollow rod 132 is a latch 154 having oppositely extending legs 156, 158 to actuate control micro-switches LS3, LS4 (FIGS. 16, 18, 19) for reasons to be described in greater detail later.

The inserting rod 134 is controlled heightwise by a double acting air motor having a cylinder 160 (FIG. 4) which is machined into the main head portion 130. The rod 134 extends from the piston of the air motor cylinder 160 down through the lower end of the hollow rod 132 and terminates in an insulative insertion member 162 adapted to engage the component body. Both the main head portion 130 as well as the actual insertion member 162 have means at the upper end of said members allowing the extent of the downward stroke to be accurately adjusted. It is further to be noted (See FIG. 4) that for sequencing purposes the vertically reciprocable members have micro-switch contact points to control the sequence of steps, LS1 at the top of the stroke of the head, LS2 at the bottom of the head stroke and LS5 at the bottom of the stroke of the inserter, their operation in a cycle being considered in greater detail hereinafter.

Figure 14:
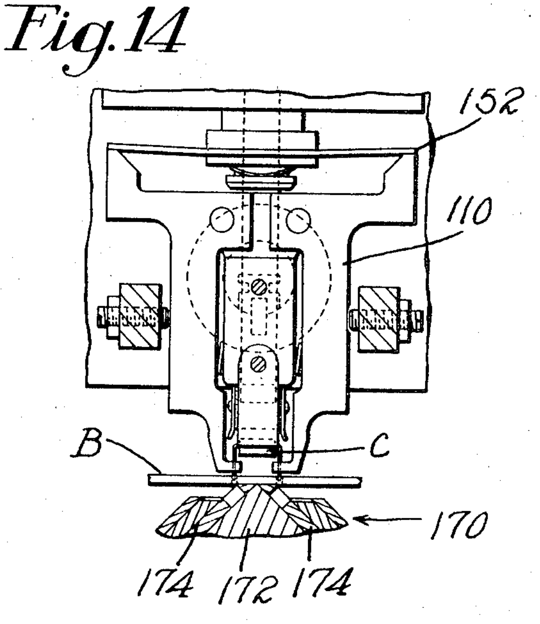
FIG. 14 is a vertical section through a portion of the insertion head just prior to lead insertion and showing the cut and clinch mechanism in the downward position.
Figure 15:
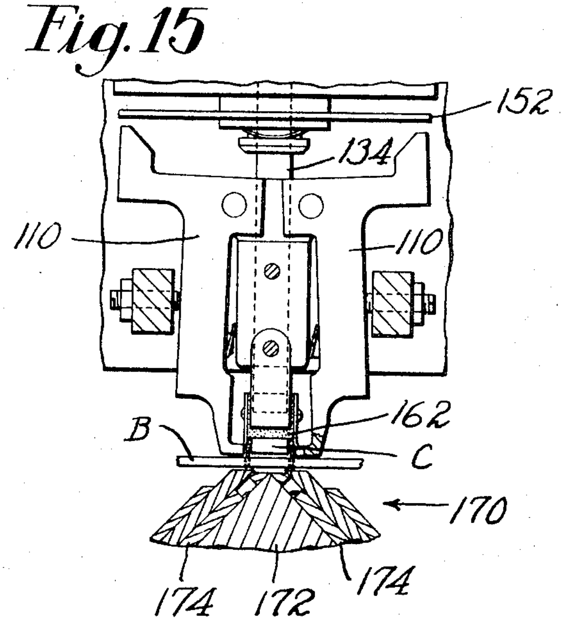
FIG. 15 is a view similar to FIG. 14 but showing the cut and clinch mechanism in its upper position.

When the component C is within the conforming grasp of the closed fingers 111, the transfer mechanism 80 retracts for reloading as above mentioned and the entire component inserting head 130 is moved downwardly to a position whereat the lower ends of the leads of the component are very nearly or partially inserted into the lead receiving holes of the circuit board B. The circuit board B is supported by conveyor or other means not shown. At this position the head stops its downward movement, the fingers 111, 111 open to release the leads and the inserting rod 134 individually continues to descend to urge the component downwardly until all of its leads project through the component receiving board and the component rests upon the shoulders of the leads. The leads of the component, which are now held downwardly by the component insertion mechanism yieldingly bearing on the body of the component, are trimmed to proper length and crimped over to electrically connect them into printed or other circuitry on the underside of the board. The mechanism 10 selected for this cutting and bending which is shown clearly in FIGS. 1, 14, and 15, is similar to that disclosed in U.S. Pat. No. 3,034,382, filed in the name of H. K. Hazel and issued May 15, 1962, with the exception that the cut and clinch mechanism herein designated 170, having an anvil 172 and shearing knives 174 (driven by an air motor 175 controlled by limit switch LS14, see FIG. 18) is adapted to trim simultaneously a multiplicity of dual in-row leads instead of the single lead on each end of the component, as shown in the just cited patent. The anvil 172 provides localized upward support to the board adjacent the lead receiving holes during shearing and clinching. It is further to be noted in FIG. 14 that the fingers 111 have guided the descending leads 180 of the component C to a position just below the surface of the circuit board 182, whereas thereafter as shown in FIG. 15 the fingers have released the component C allowing the insulation 162 on the end of the inserter bar to urge the component down to its seated position whereat the shearing knives 174 will angularly cut and then wipe-clinch the lower end portions of the leads inwardly.

FEED MECHANISM

Figure 5:
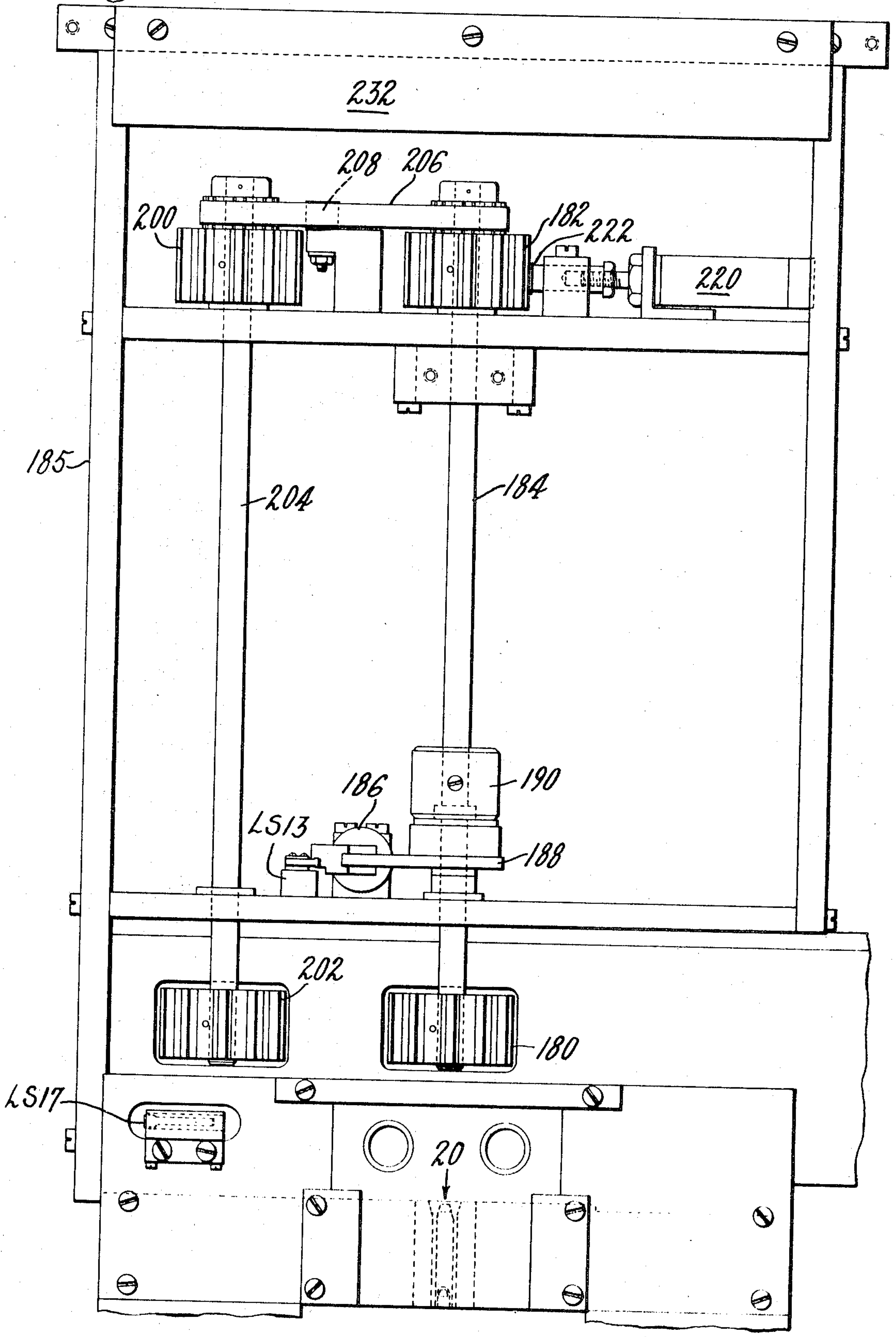
FIG. 5 is a front view of a mechanism for automatically moving typical packages of components from a magazine to the machine for processing.
Figure 6:
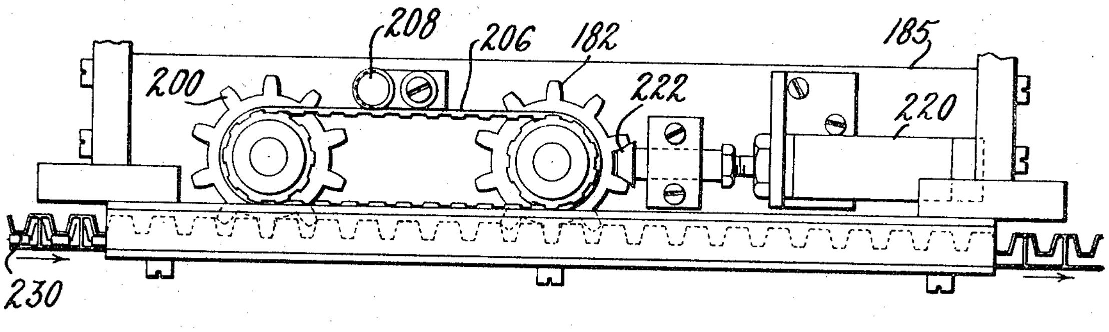
FIG. 6 is a plan view of locking mechanism for assuring that the device of FIG. 5 stops immediately above and in register with a component delivery chute.
Figure 7:
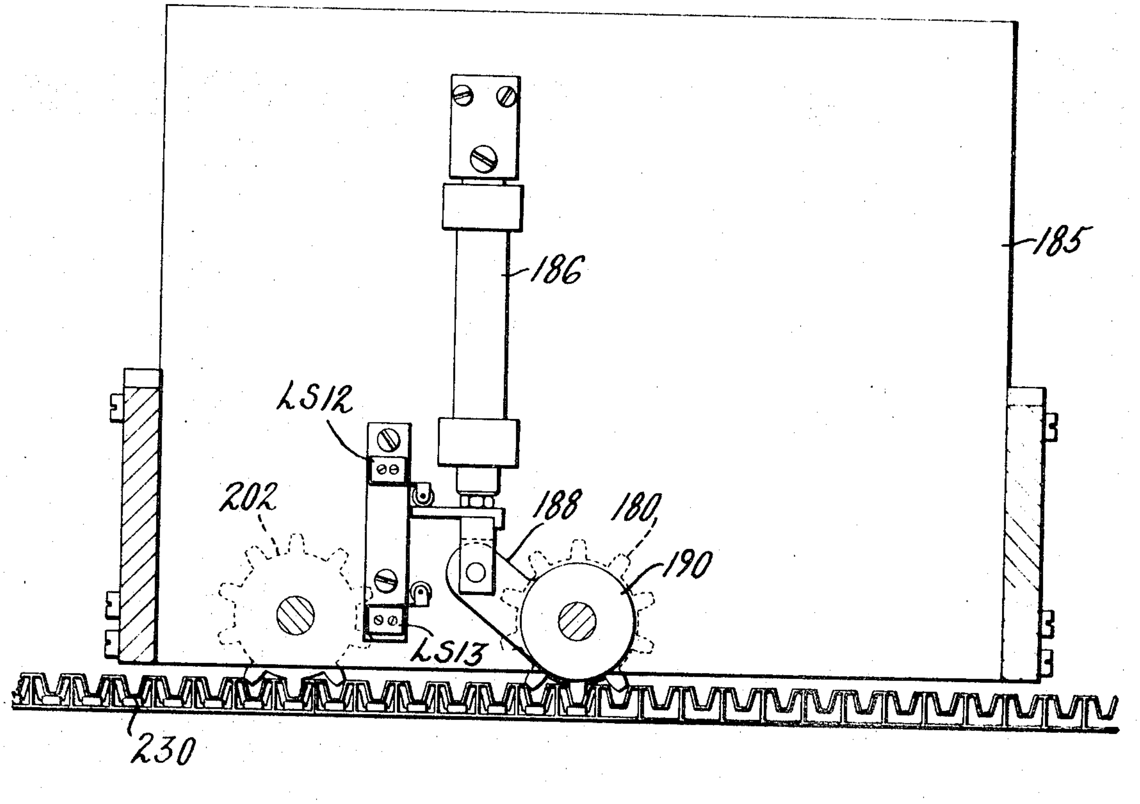
FIG. 7 is a plan view of driving means for the feed mechanism shown in FIG. 5.

As was mentioned above, the illustrative component inserter can handle components fed either by hand or automatically. As an illustration of a way in which the machine is adapted for automatically feeding the components, there is shown in FIGS. 3, 5, 6, and 7, a means for advancing successive packages of components to a release position above the chute 20. Commercially available package units or multi-lead or integrated components contain a plurality of the components slidably stacked end to end with the leads extending more or less uniformly in the same direction. These packages may be of a single configuration holding only one stack of the component, or as shown in FIGS. 6 and 7, may be adapted to hold a plurality of aligned stacks of components, the package being generally flat so that the stacks are arranged side by side.

The illustrative automatic feed device is specifically designed, when continuous high output is desired, to handle those packages of components wherein a stack of components is disposed immediately adjacent to at least one stack of similar components. It will be apparent that this package, preferably a dispensable magazine, may contain any number of conveniently assembled stacks of components and may be of any conveniently handled size as long as the components are uniformly oriented. The feeding means 8 is shown in dashed lines in operating position in the upper portion of the illustrative component inserting machine in FIG. 1.

The automatic feed means comprises a pair of gears 180, 182 (FIG. 5) mounted upon opposite ends of a vertically disposed shaft 184 located directly above the chute 20 which receives the components singly, as described above. The shaft 184 is journalled in retaining superstructure 185 rigidly secured to the frame 3 and driven by an air motor 186 (FIGS. 5, 6) acting through a lever 188 and a one-way clutch 190. The arrangement is such that the pair of gears 180, 182 mesh with and tend to move a stick or cartridge from the left to the right, as seen in FIGS. 5 and 7. It is to be noted that rotation of the shaft 184 is directly controlled by a pair of limit switches LS12, LS13 fixedly mounted adjacent to the air motor 186 to determine the extent of movement of the piston within the air motor, these switches being actuatable by an arm of its piston rod. A second pair of feed gears 200, 202 to the left of the driven shaft 184, as seen in FIG. 5, is mounted on a shaft 204 and synchronized with the gear 182 by means of a drive belt 206 kept taut by an idler roll 28. Mounted on the structure 185 adjacent to the gear 182 is an air motor 220, having directly connected to its reciprocable piston rod a plunger detent 222 designed for interaction with the spaces between the teeth of the gear 182.

In operation, when the automatic feeding mechanism is used in conjunction with the illustrative machine, at least one corrugated magazine 230 (FIGS. 1, 6, 7) having several vertical stacks of components is placed in position at the front of the superstructure 185 with its upper end behind a retaining guide plate 232 and its lower end in a horizontal slideway within the main frame of the illustrative machine. With the magazine in this position, whatever means heretofore used to retain the components in the magazine is removed. As can be seen in FIG. 3, the lower end of the magazine has a rearwardly extending lug which slides within a provided notch 234. With the magazine so placed, it is restricted to left-to-right stepwise feeding in the machine and will be so moved by the four gears 180, 182, 200, and 202 meshing with the rack-like ribs and grooves of each magazine. When the switch LS10 (FIG. 3) indicates to the feed mechanism that there is no component in the first lead forming position in the chute 20 because a stack is empty, the air motor 186 will be activated moving the magazine 230 one step so that a new stack of components C will be in position for movement down the chute 20. It is at this time that the plunger 222 meshes with the gear 182 and thus indexes and locks the magazine in aligned dispensing position so that the entire contents of a particular stack can be discharged under the influence of gravity to the chute 20. The lock will then be automatically released upon proper signal from the switch LS10, indicating that a new stack is necessary and subsequently relocks when a new supply of stacked components is positioned over the chute. There is provided in this mechanism a limit switch which will indicate either to the operator or to another automatic supplying means when the automatic feed mechanism is ready to receive a new magazine of the components to be inserted.

RESUME OF SEQUENCE OF OPERATIONS

Figure 16:
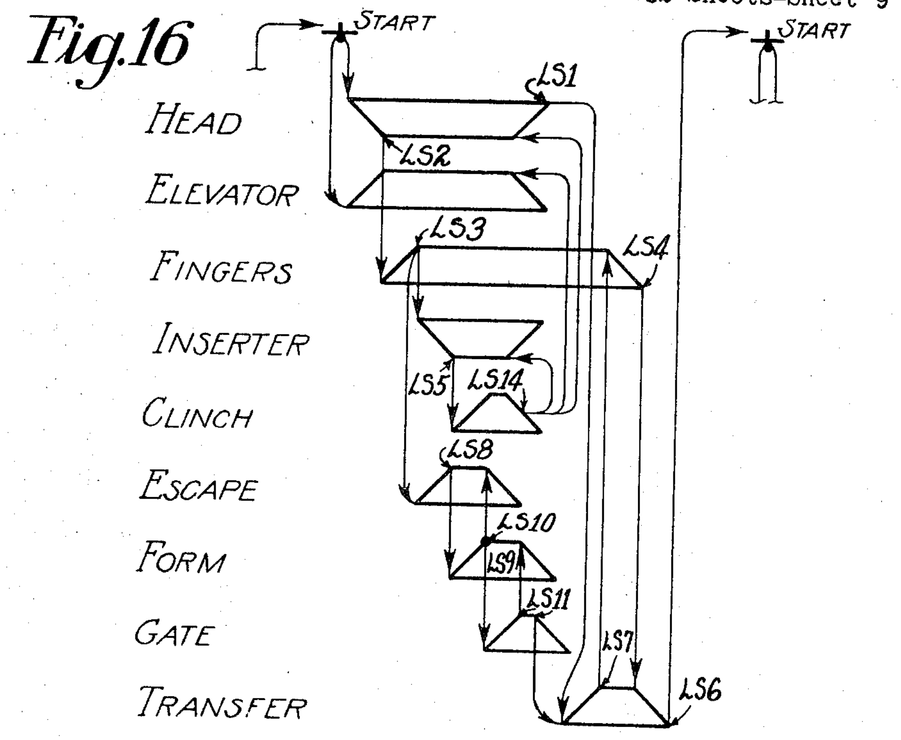
FIG. 16 is a schematic timing diagram showing the sequence of operations in a typical insertion cycle.
Figure 19A:
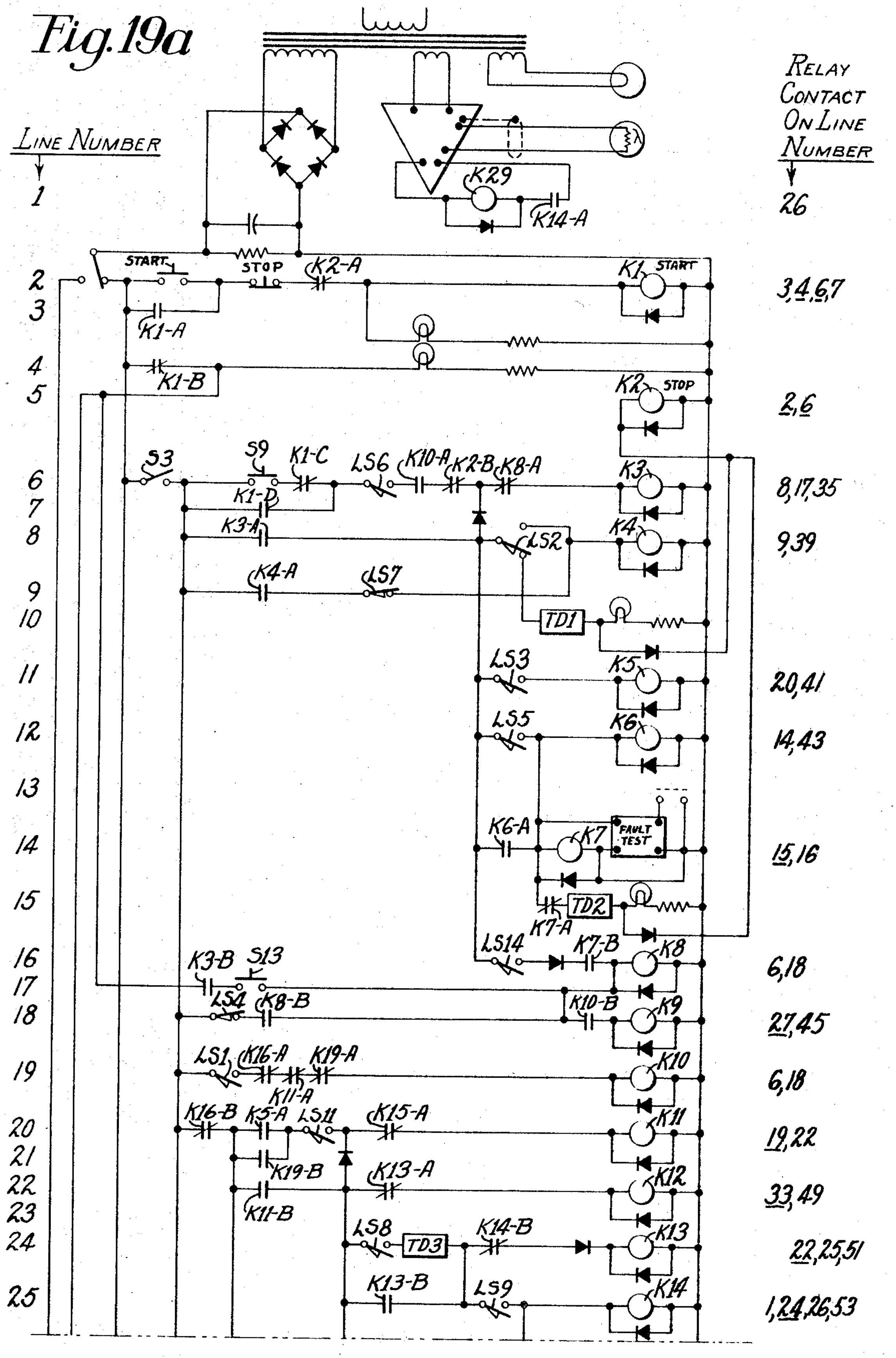
FIGS. 19*a* and 19*b* are interconnected portions of a diagram of the electric circuitry of the illustrative machine.

FIG. 16 shows a schematic representation of the sequence of operations of the machine in a normal operating cycle assuming there are no shortages of components, misinsertions or other mechanical errors which would cause the machine automatically to shut off. The sequence begins with an insertion, and will begin with this operation even in the event that there is no component ready at the position to be mounted. The operation in the absence of a component will be referred to later in more detail with respect to FIG. 17. For the present it is assumed that there are components at all of the operating zones, i.e., at the insertion stations, upon the transfer mechanism at the forming station and at the escape station, all illustrated in FIG. 3. The operator starts the machine cycle by closing a starter switch S (FIGS. 16, 19*a*). The entire insertion head 130 is caused to move downwardly to its lowermost position, and the cylinder 11 will be pressurized to cause the cut and clinch mechanism 170 to be raised to an operating position immediately beneath the underside of the component receiving board. The reason for these heightwise movements toward the board B is to avoid interference with previously mounted components thereon during a repositioning of the board. When the head has reached its lowermost position and the leads are conformed, the fingers 111 re-open and the inserter 132 urges the component leads into their respective positions in the circuit board. Simultaneous with this insertion the escapement means 22 allows another component C into the first lead forming position at the gate 40. The escapement rod 28 returns, retaining the stack of components located above it in the chute 20 as well as in the magazine 230. The cut and clinch mechanism 170 beneath the board B severs the projecting ends of the leads to proper length and bends them over to secure them respectively to their correct portion of the circuitry beneath the board.

Simultaneous with the cut and clinch being performed on one component, the former 46 pushes another and subsequent component into position between the two outside formers 50, 52 assuring that the leads are in an outwardly directed, minimal spread position, as described above. The former 46 returns allowing the component engaged thereby to slide down the chute to the gate 40. The insertion head 130 then moves to its uppermost position, the motor 11 thereupon permitting the cut and clinch mechanism 170 to return to its lowermost position. The clinching anvil 172 retracts, and the gate 40 is moved to its forwardmost position allowing the next component to be mounted to drop down the chute 20 to rest upon the transfer mechanism 80. The gate now returns, stopping another component from prematurely moving down the chute. By means not herein shown the component receiving board B is moved laterally to a new receiving position whereupon the transfer means moves the last mentioned component to position and support it beneath the fingers 111. Now the fingers close upon the component and the transfer returns ready for another cycle.

Figure 17:
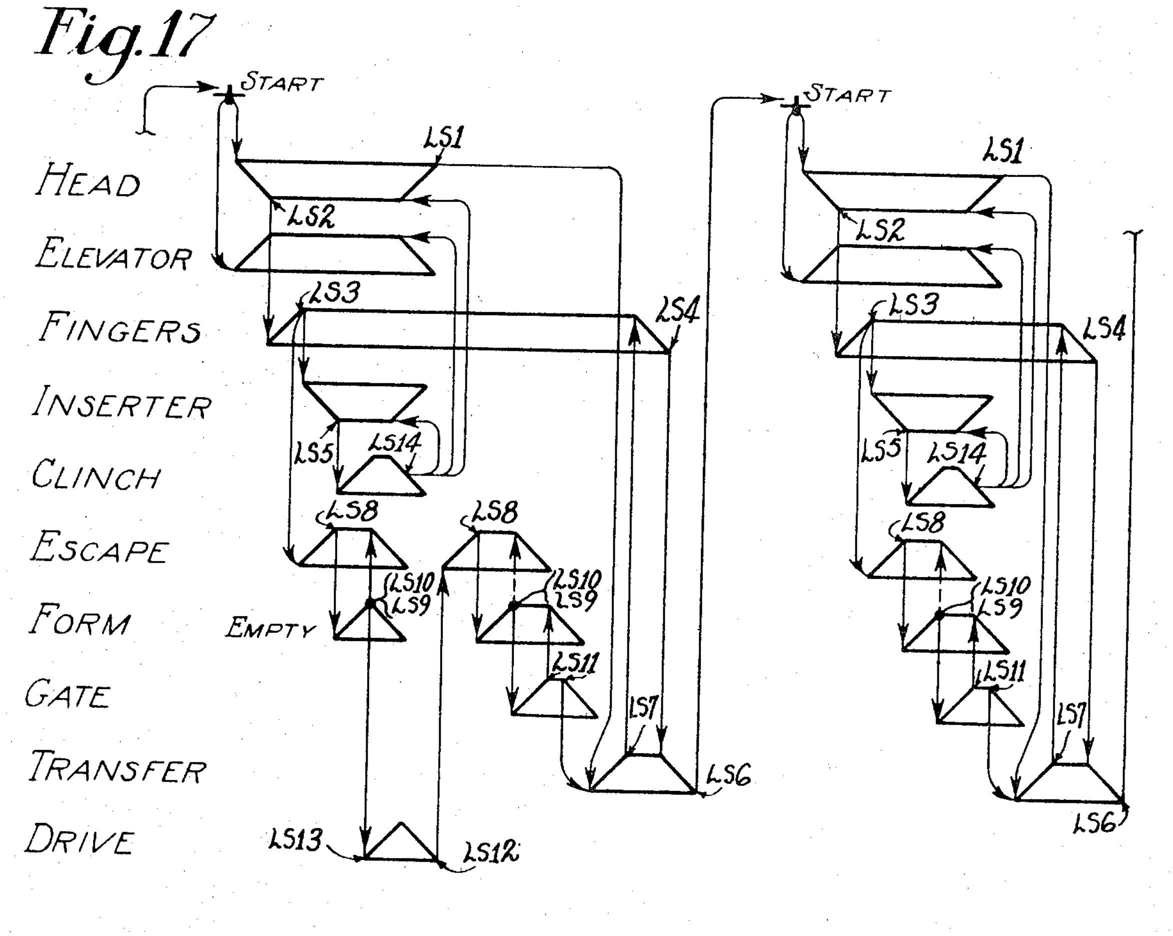
FIG. 17 is a timing diagram similar to FIG. 16 with the exception that it demonstrates how the machine will automatically reverse itself in the event of a component not being properly in position.

FIG. 17 is similar to FIG. 16 with the exception that FIG. 17 depicts schematically a situation where the former 46 finds that there is no component to be formed, i.e., at the beginning of a new run or when a component supply stack has been exhausted. In this event the former immediately returns upon activation of the contact switch LS10, the inserter 134 goes to its lowermost position and is immediately returned, and the escapement mechanism 22 opens to allow another component to fall into position. When another component has fallen onto the gate 40 in position to be engaged by the former 46, the former 46 proceeds with its operation and the sequence continues as long as components are supplied one after another.

When components are properly supplied, i.e., there are sufficient magazines 230 and all of the magazines are full, the operator does not necessarily need to start each sequence. It is fully within the concept of the illustrative machine that the component receiving board B will be automatically moved from component receiving position to component receiving position, between each operating cycle described above, by means of an automated or preprogrammed positioning device such as a computer, numerical control or the like.

It will be observed that in the event there is no component at the former 46 and controls of the machine so signal, if the automatic supply is in use, this signal which caused the machine to partially re-cycle would also indicate to the automatic component supply means to move the magazine 230 one step, allowing a new stack of components to be in position to slide down the chute 20 and thus be properly operated upon and inserted.

Occurrence of any one of certain possible malfunctions will cause the machine to stop and remain inoperative until the operator makes the necessary correction. These events include a misinserted or jammed component, and missing or non-presented component at the board B. When the problem is corrected, the machine is recycled in accordance with the operational sequence shown in FIG. 17.

THE CONTROL CIRCUIT

Figure 18:
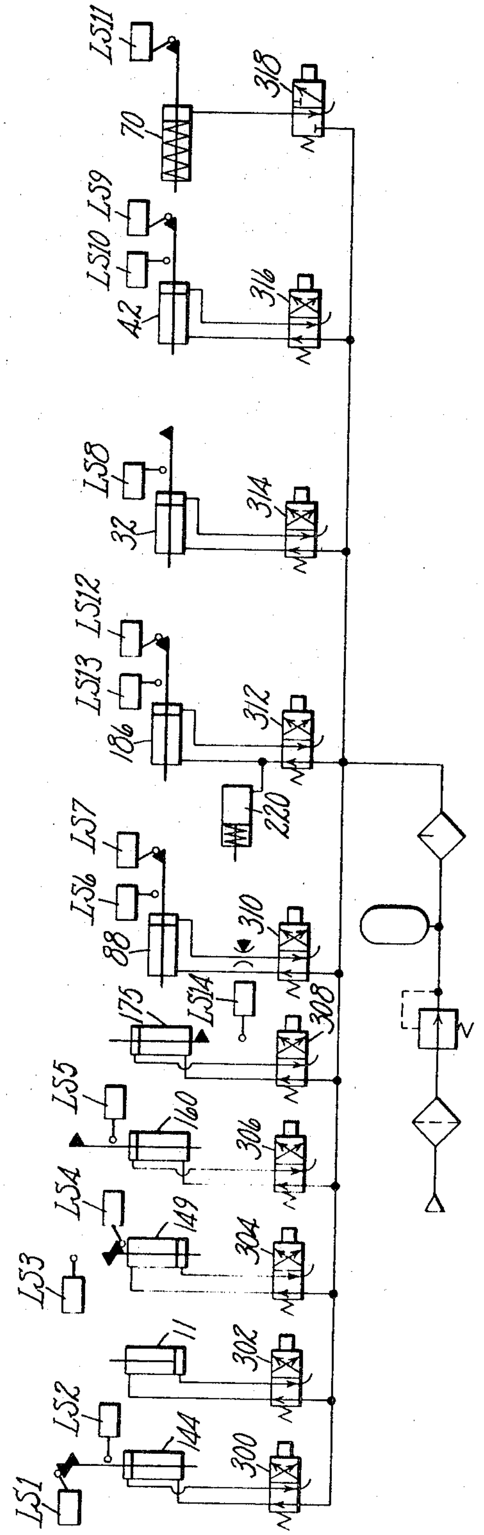
FIG. 18 is a schematic diagram of the pneumatic control system of the illustrative machine.
Figure 19B:
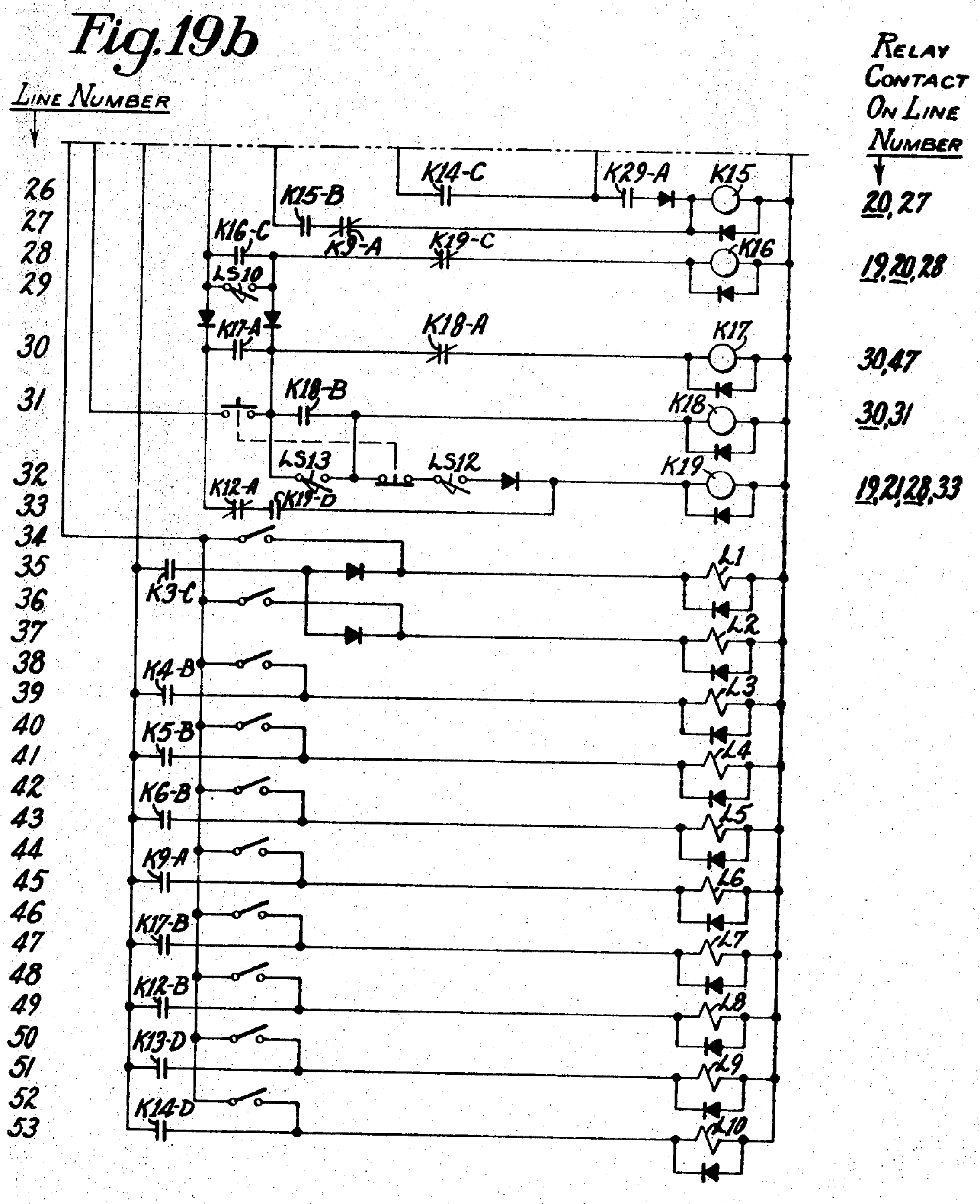

Reference will now be made to FIGS. 18, 19*a*, and 19*b*, which schematically show the control circuits used in the illustrative mechanism. Reference will be made only to those portions essential to understanding a cycle of operation of the mechanism above described. As shown in FIG. 18, air under pressure is supplied through a common feeder pipe which provides a constant air pressure on air control valves respectively designated 300, 302, etc. through 318.

To the right of the schematic of the electric circuit, FIGS. 19*a* and 19*b*, there is a column of figures indicating circuit lines wherein a contact is made or broken upon the operation of the solenoid in that same line. For instance, in line No. 2 as shown to the left of the schematic, activation of a solenoid K1 will open a contact in lines 3 and 7 and close a contact in lines 4 and 6.

To begin operation of the machine, an operator will press a start button S1, shown in line 2, FIG. 19*a*. As a consequence the solenoid K1 locks closed and a work supporting table (not shown) is moved to its component receiving position. A solenoid K3 (line 6) is activated either manually or by some automatic device. The valves 300 and 302 are thereby activated causing the air motors 144 and 11 respectively to operate. The head 130 moves down and simultaneously the clinch mechanism (elevator) 10 moves up, as shown in FIG. 16. The switch LS2, in line 8 (FIG. 19*a*) closes at the lower end of the head stroke, energizing a solenoid K4, line 8, which locks.

If the switch LS2 did not close due to an obstruction under the head, for instance a jam, then solenoid K2 would be energized, after one second delay, deenergizing solenoid K1, line 2, thus terminating operation as a safety measure.

The fingers 111, which have been closed around a component C if one was in presented position, are now opened upon signal from the microswitch LS2, which has activated the valve 304 (FIG. 18) causing the air motor 149 to raise the rod 132 to its uppermost position. The fingers are thereby opened and the switch LS3, line 11 (FIG. 19*a*) closed and deenergizes the solenoids K5 (line 10) K11 (line 20) and K12 (line 22). The valve 306 (FIG. 18) is rendered operational causing the air motor 160, which is the control for the inserter 132, to move to its lowermost position closing a switch LS5, line 12 (FIG. 19*a*) energizing a solenoid K6 (line 12).

In the illustrative circuit there is a fault test which is enabled at this time, applying a small voltage across the component leads between the inserter 132 and the clinching mechanism 10. The presence of a component energizes the solenoid K7 (line 14). If no component is present, the solenoid K7, line 14, would not energize and a fault-showing circuit would be energized and solenoid K2, line 4 would be energized after a slight delay, terminating operation of the machine.

Simultaneously with the operation of the air motor 160 (FIG. 18) which controls the insertion, the escapement 24 is activated by means of the valve 314 (FIG. 18) which causes the air motor 32 to move to the left in the figure, closing switch LS8, line 24 (FIG. 19*a*) and energizing solenoids K13, line 23, after a slight delay. The escapement motor 32 immediately returns prohibiting the movement of another component down the chute to the first lead positioning means 22, as described above.

At the bottom of the inserter stroke solenoid K6 is energized and valve 308 (FIG. 18) is activated, putting the air motor 175 into operation to cause the clinching mechanism 170 to cut and form the component leads, closing switch LS14, line 16 (FIG. 19*a*) deenergizing solenoid K8, line 16, which locks and deenergizes solenoid K3 (line 6), solenoid K5 (line 11), solenoid K6 (line 12) and solenoid K7, line 14.

Approximately simultaneous with the clinch described above, the valve 316 is opened causing the air motor 42 (FIG. 18) which controls the former 46 (FIG. 8) to move to the left as seen in the figure and the component leads are urged to a positive, outward bend. Switch LS9, line 25 (FIG. 19*a*) closes at completion of the form stroke energiding solenoid K14 (line 25) and deenergizing solenoid K13 (line 24). The air motor 42 and the former automatically return. Note that if there were no component present to form, switch LS10, line 29 (FIG. 19*b*) would close, see FIG. 17, deenergizing solenoid K16, line 28 and solenoid K17, line 30.

When LS10 is closed (no component to form) the automatic component supply advances a magazine one channel, energizes to place a new supply of components in line with chute 20 and solenoid K18, line 31 (FIG. 19*b*) with switch LS13, line 32, contacted when drive motor 132 is extended. When the driver motor 132 returns, switch LS12, line 32 energizes solenoid K19 (line 32), which would then deenergize solenoid K11 (line 20) and solenoid K12, line 22, which causes a repeat of the escapment movement as described above. During this time solenoid K10, line 19 would not be permitted to energize.

In response to the closing of switch LS14 by the clinch mechanism, the head 130 returns to its uppermost position, and the clinching mechanism 10 returns to its lowermost position. The inserter 132 rises.

Approximately simultaneous with the above described movements, the valve 318 (FIG. 18) is activated, causing the spring return air motor 70 to move, opening the gate 40, dropping another component down the chute. A light beam (source not shown) is interrupted by the component deenergizing solenoid K15, line 26 (FIG. 19*b*) which in turn deenergizes solenoid K11, line 20, solenoid K10, line 19 is energized. The gate returns.

The table is now moved to a new insert position and simultaneous with the table movement the transfer 84 moves forward carrying another component into position beneath the inserter 132. The transfer is made operational by the closing of LS1 by the head 130 and the consequent opening of valve 310 (FIG. 18) moving air motor 88 to the left as seen in the figure. Switch LS7, line 9 (FIG. 19*a*) is opened at the completion of the transfer, deenergizing solenoid K4, line 5. The fingers close upon the component opening switch LS4, line 18 and deenergizing solenoids K8, line 16 and K9, line 18. The transfer mechanism 84 returns to its rightwardmost position, as shown by the air motor 88 (FIG. 18) closing switch LS6, line 5. With the table in position, the transfer back, a new insertion cycle is begun by energizing solenoid K3, line 6.

Lines 35–53 (FIG. 19*b*) are manual override or testing circuits enabling each operation to be done independently when desired and have solenoids L1, L2, and L10 corresponding with and controlling valves 300, 302, and 318 of FIG. 18.

The illustrative mechanism begins with the insert cycle. It is well within the contemplation of this invention that if it were not desirable to begin the machine with the insert cycle, such a change would not remove the machine from the inventive concepts herein disclosed.

It will be understood that the particular device embodying the invention is shown by way of illustration only and not as a limitation of the invention. The principles and features of this invention may be employed in varied and numerous embodiments without departing from the scope of the invention.

Having thus described our invention, what we claim as new and desire to secure by Letters Patent of the United States is:

1. A machine for mounting components on workpieces having preformed lead receiving holes, said components respectively having a body and a plurality of leads extending from opposite sides of said body, comprising: a frame, a first means mounted on the frame for assuring that the opposing leads of each component to be mounted are generally predeterminedly spaced, said first means comprising in cooperative relation a relatively movable tapered plunger and spaced lead conforming walls, a second operating means for more accurately positioning the lead ends of the respective components with respect to one another and to said lead receiving holes, respectively, means mounted to said frame for transferring the components singly from the first to the second lead positioning means, and means reciprocably supported by the frame adjacent to the second lead positioning means to successively insert the prepositioned leads of the successively transferred components into said lead receiving holes.

2. A machine as set forth in claim 1 including means to temporarily stop the component within the transfer means and a yieldable member forming a portion of the transfer means and disposed to abut the component in its stopped position opposite the tapered plunger for yielding under displacing pressure from the plunger, said member providing a yieldable component backing during the lead positioned movement of the plunger and further for returning the component to the transfer means upon removal of the displacing force of said plunger.

3. A machine as set forth in claim 1 wherein the transfer means comprises a reciprocably mounted transfer bar which carries the component body in a horizontally disposed position with the leads extending downwardly on opposite sides of the bar and the component body resting on the upper surface of the bar, said transfer bar being formed with longitudinal lead engaging surfaces along opposite sides of said bar for acting in conjunction with the second lead positioning means to position the leads simultaneously transversely of their component body.

4. A device a set forth in claim 1 wherein the second lead positioning means includes a pair of pivotally mounted members cooperative with the transfer means for grasping the component thereon, securely holding the component against retractive movement of the transfer means, and for positioning the lead ends for insertion in said holes, respectively.

5. A machine as set forth in claim 4 wherein the pair of pivotally mounted members have finger-like depending portions closeable between the adjacent leads on each side of the component and including camming surfaces to urge the free ends of said leads to a predetermined position with respect to each other both longitudinally and laterally of the component body.

6. A machine for mounting components having elongated bodies and leads depending from opposite sides of the bodies by inserting the leads into preformed holes in a receiving board comprising: a frame, an inserter mounted on the frame for reciprocation toward and from the receiving board, transfer means in the frame for guiding consecutive components to be mounted from a source of supply to a position at its discharge end in registry with the inserter, a first lead conditioning means mounted to the frame adjacent the transfer means, said lead conditioning means including means to urge the leads on each side of the component body into substantial parallelism and the lead ends on opposite sides of the body into lines spaced a predetermined distance apart, a second lead conditioning mechanism mounted to the frame adjacent said discharge end of the transfer means and having means to finally position the free ends of the leads into alignment with the respective receiving holes and retain them in this position during a portion of the insertion operation, and means sequentially controlling the inserter and the second lead conditioning means whereby the leads are successively positioned and urged into their holes.

7. A machine as set forth in claim 6 wherein the transfer means comprises a horizontally reciprocable transfer bar having grooves on opposite sides designed to be engaged by the depending leads of a horizontally disposed component carried upon the upper surface of said bar, and power means causing said bar when extended to cooperate with the second lead conditioning means, said second lead conditioning means for restraining the component and positioning its leads while the transfer bar retracts.

8. A machine as set forth in claim 6 wherein the second lead conditioning means comprises a pair of cooperative, pivotally mounted members having inwardly directed finger-like portions which grasp a component by extending between the leads, said portions respectively having cam surfaces arranged to urge the leads to a predetermined spacing relative to each other and to urge the leads inwardly against the natural resilience of said leads to a predetermined position in alignment with the receiving holes, means reciprocably mounted to support the component in a position to be engaged by the pivotally mounted members and means for moving the reciprocable means and a supported component to the engaging position and to retract the reciprocable means after relinquishing control of the component to the pivotally mounted members.

References Cited

UNITED STATES PATENTS

| | | | |
|---|---|---|---|
| 2,879,585 | 3/1959 | Petersen | 29—203 |
| 2,896,213 | 7/1959 | Alderman et al. | 29—203 |
| 3,034,382 | 5/1962 | Hazel | 72—331X |
| 2,949,665 | 8/1960 | Bergsland et al. | 29—203 |
| 3,321,825 | 5/1967 | Cooke | 140—147 |
| 3,349,813 | 10/1967 | Pastuszak | 140—147 |

THOMAS H. EAGER, Primary Examiner

U.S. Cl. X.R.

29—206